(12) United States Patent
Webb

(10) Patent No.: US 9,746,351 B2
(45) Date of Patent: Aug. 29, 2017

(54) LIGHT CONDUCTOR DEVICE AND METER DEVICE INCLUDING THE SAME

(71) Applicants: DENSO International America, Inc., Southfield, MI (US); DENSO CORPORATION, Kariya, Aichi-pref. (JP)

(72) Inventor: Gareth Webb, Farmington, MI (US)

(73) Assignees: DENSO International America, Inc., Southfield, MI (US); DENSO CORPORATION, Kariya (JP)

(*) Notice: Subject to any disclaimer, the term of this patent is extended or adjusted under 35 U.S.C. 154(b) by 624 days.

(21) Appl. No.: 14/273,815

(22) Filed: May 9, 2014

(65) Prior Publication Data

US 2015/0321600 A1 Nov. 12, 2015

(51) Int. Cl.
*B60Q 3/04* (2006.01)
*G01D 7/04* (2006.01)
*G01D 13/28* (2006.01)
*B60Q 3/64* (2017.01)
*B60Q 3/14* (2017.01)

(52) U.S. Cl.
CPC ............... *G01D 7/04* (2013.01); *B60Q 3/14* (2017.02); *B60Q 3/64* (2017.02); *G01D 13/28* (2013.01); *B60Q 2500/00* (2013.01)

(58) Field of Classification Search
CPC .......... G01D 7/04; G01D 13/28; B60Q 3/004; B60Q 3/044
See application file for complete search history.

(56) References Cited

U.S. PATENT DOCUMENTS

2015/0158422 A1* 6/2015 Trevillian, Jr. ........ B60Q 3/044
362/23.16

FOREIGN PATENT DOCUMENTS

JP 2009-115716 A 5/2009

* cited by examiner

*Primary Examiner* — Thomas M Sember

(57) ABSTRACT

A light conductor device receives light from a light source. The light conductor includes a radial conductor including an annular body, a conductor base, and outer segments. The annular body extends in a circumferential direction. The conductor base extends from the annular body inward in a radial direction. The conductor base extends in the circumferential direction. Each of the outer segments extends from the annular body outward in the radial direction. The outer segments are arranged in the circumferential direction and distant from each other in the circumferential direction. The annular body is located between the conductor base and the outer segments in the radial direction to bridge the conductor base and the outer segments into a single piece.

16 Claims, 10 Drawing Sheets

LIGHT CONDUCTOR DEVICE AND METER DEVICE INCLUDING THE SAME

TECHNICAL FIELD

The present disclosure relates to a light conductor device. The present disclosure further relates to a meter device including the light conductor device.

BACKGROUND

A meter device is generally equipped in a vehicle for indicating information such as a vehicular speed and an engine revolution. A meter device may be comprised of a flat LCD screen to indicate a meter pointer and tick marks. The flat LCD screen may be further desirable to have a three-dimensional appearance.

SUMMARY

According to an aspect of the present disclosure, a light conductor device is configured to receive light from a light source. The light conductor comprises a radial conductor. The radial conductor includes an annular body extending in a circumferential direction. The radial conductor further includes a conductor base extending from the annular body inward in a radial direction, the conductor base extending in the circumferential direction. The radial conductor further includes a plurality of outer segments each extending from the annular body outward in the radial direction, the outer segments arranged in the circumferential direction and distant from each other in the circumferential direction. The annular body is located between the conductor base and the outer segments in the radial direction to bridge the conductor base and the outer segments into a single piece.

According to another aspect of the present disclosure, a light conductor device comprises a radial conductor formed of a light-conductive material. The radial conductor includes an annular body extending in a circumferential direction. The radial conductor further includes a conductor base extending from the annular body inward in a radial direction, the conductor base extending in the circumferential direction. The radial conductor further includes a plurality of outer segments arranged in the circumferential direction. The radial conductor is configured to reflect light on a radial-conductor receiver reflection surface and further to reflect the light on a radial-conductor emitter reflection surface to an outside of the radial conductor.

According to another aspect of the present disclosure, a light conductor device comprises a radial conductor including a conductor base extending in a circumferential direction and a plurality of outer segments arranged in the circumferential direction. Each of the outer segments has a radial-conductor emitter reflection surface at an outer position. The conductor base has a radial-conductor receiver reflection surface at an inner position inside the outer position in the radial direction. The radial conductor is configured to receive light at the inner position and to emit the light at the outer position remotely in the radial direction by internally reflecting the light on the radial-conductor receiver reflection surface and further on the radial-conductor emitter reflection surface.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

Figure 1:
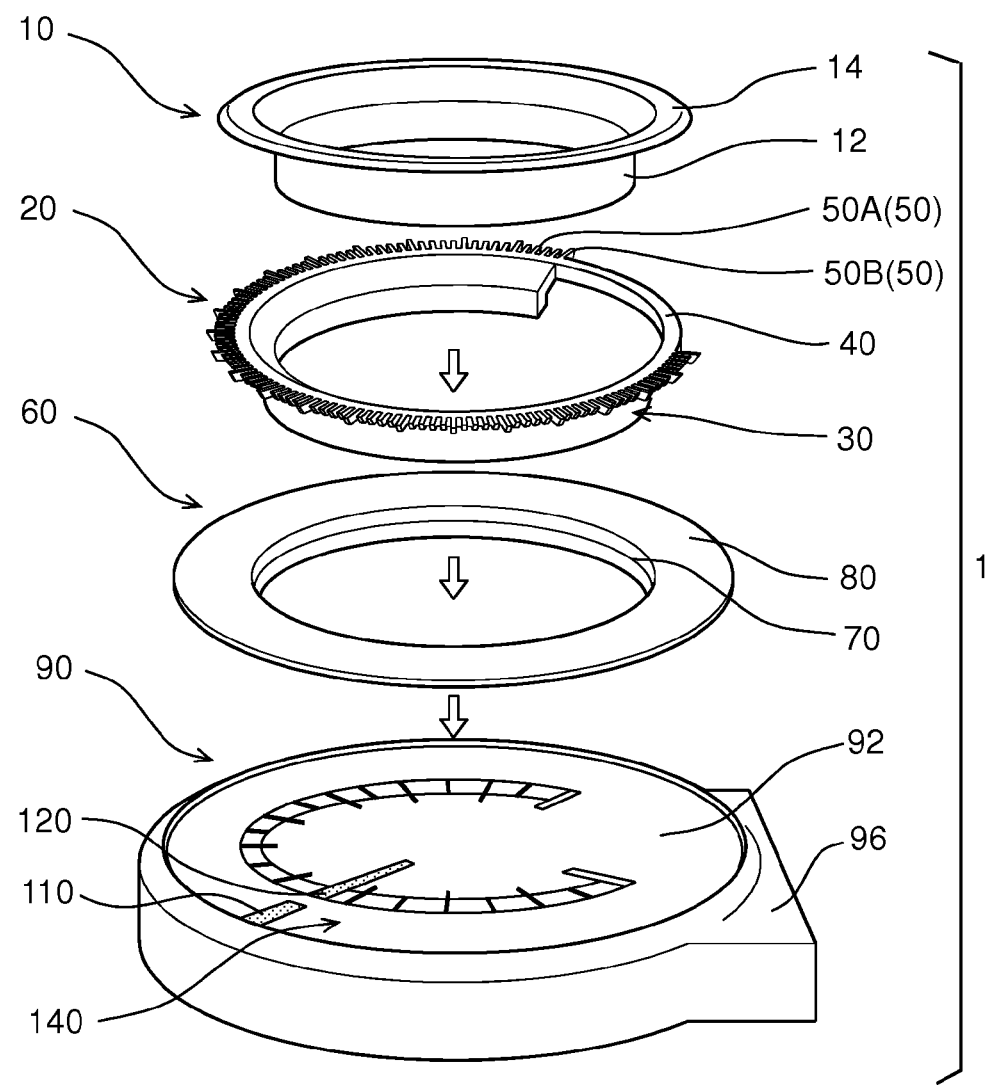
FIG. 1 is an exploded perspective view showing components of a meter device according to a first embodiment.
Figure 1:
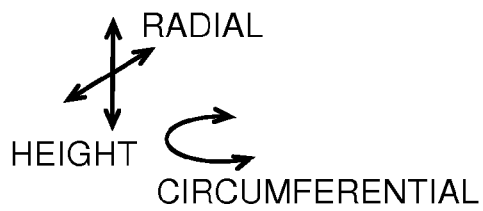

As follows, a first embodiment of the present disclosure will be described with reference to FIGS. 1 to 8. A meter device 1 includes an opaque cover 10, a radial conductor 20, a ring conductor 60, and a display 90. The opaque cover 10, the radial conductor 20, and the ring conductor 60 are coaxially stacked together and are mounted on the display 90.

The opaque cover 10 includes a cover body 12 and a cover disc 14, which are integrally molded of an opaque plastic material, such as ABS resin. The cover body 12 is in a tubular shape extending in a height direction shown by "HEIGHT" in the drawings. The cover body 12 has a conical top connected with the cover disc 14. The cover disc 14 is located on the outside of the conical top in a radial direction shown by "RADIAL" in the drawings. The cover disc 14 is in a disc shape extending in a circumferential direction shown by "CIRCUMFERENTIAL" in the drawings. The cover disc 14 is chamfered at its outer circumferential periphery to have a circular inclined surface faced upward in the drawing.

The radial conductor 20 is integrally molded of a substantially transparent light-conductive material such as acrylic resin (PMMA) or polycarbonate resin by, for example, injection molding. The radial conductor 20 includes a conductor base 30 and multiple outer segments 50, which are bridged with each other through an annular body 40 into a single piece.

The annular body 40 is in an annular shape extending in the circumferential direction. The conductor base 30 is substantially in a partial tubular shape extending in the height direction. The conductor base 30 has a cross section perpendicular to the height direction, and the cross section is substantially in a C-shape. The conductor base 30 extends in the circumferential direction in a predetermined meter angular range excluding a no-radial conductor region on the right side in FIG. 1.

The outer segments 50 are each in a plate shape extending outward in the radial direction from an outer circumferential periphery of the annular body 40. The outer segments 50, which are adjacent in the circumferential direction, are also distant and isolated from each other in the circumferential direction.

The outer segments 50 include large outer segments 50A and small outer segments 50B. The large outer segments 50A extend radially further than the small outer segments 50B. The large outer segments 50A are provided at a certain cycle, such as 5 or 10 units. The outer segments 50 are provided in the predetermined meter angular range excluding the no-radial conductor region on the right side in FIG. 1.

The ring conductor 60 includes a ring body 70 and a ring disc 80, which are integrally molded of a substantially transparent light-conductive material such as acrylic resin (PMMA) or polycarbonate resin. The ring body 70 is in a tubular shape extending in the height direction. The ring body 70 has a conical top connected with the ring disc 80. The ring disc 80 is located on the outside of the conical top in the radial direction. The ring disc 80 is in a disc shape extending in the circumferential direction. The ring disc 80 is chamfered at its outer circumferential periphery to have a circular inclined surface faced downward in the drawing.

The display 90 is, for example, an LCD display or an organic EL display having a full-color dot-matrix configuration having multiple pixels, which are selectively activated. More specifically, the display 90 may be an active matrix display such as a TFT LCD display and may have a lighting device to emit light to the screen. The display 90 may be an organic EL display having a self-luminous configuration without an additional lighting device.

The display 90 is configured to indicate, for example, a full-color moving picture on a screen 92. In the example of FIG. 1, the display 90 indicates a scale 140, an outer pointer 110, and an inner pointer 120. The display 90 further indicates numeral symbols (not shown in FIG. 1) indicating a vehicle speed, an engine revolution, a gear position, and/or the like. The display 90 includes a display body 96 accommodating a driver circuit for controlling activation of the pixels, the lighting device, and an I/O device. The I/O device may be connectable with an external circuit such as an ECU (electronic control device) of the vehicle to receive an electric power and to exchange graphic information related to the indicated picture with the ECU. The display 90 may further include a microcomputer configured with a CPU and a storage device for processing the graphic information. In the present example, the screen 92 is in a circular shape, and the display body 96 is partially in a circular shape and has a base.

Figure 2:
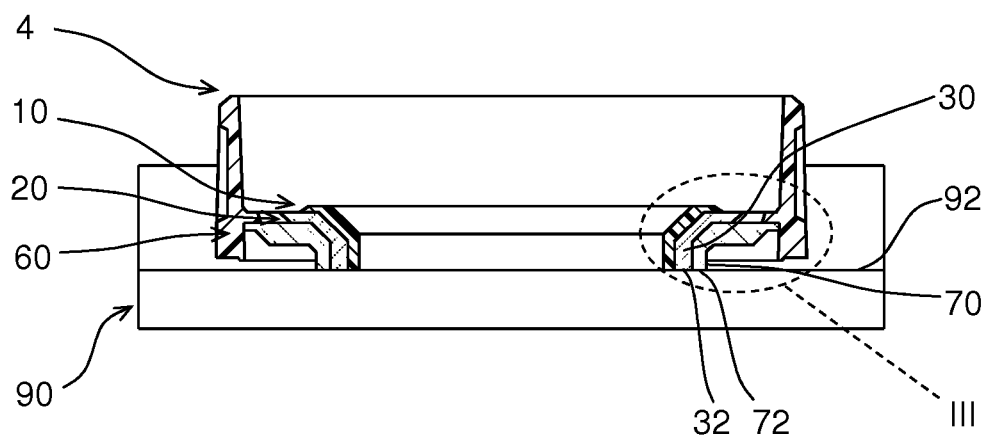
FIG. 2 is a schematic sectional view showing the meter device.
Figure 2:
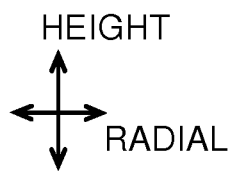

As shown in FIG. 2, the opaque cover 10, the radial conductor 20, and the ring conductor 60 are stacked together and, for example, adhered on the display 90. A housing 4 is fixed to the display 90 to house the opaque cover 10, the radial conductor 20, and the ring conductor 60.

The ring body 70 has an annular end surface 72 on the lower side in FIG. 2. The annular end surface 72 is faced to the screen 92. The conductor base 30 has an annular end surface 32 on the lower side in FIG. 2. The annular end surface 32 is faced to the screen 92.

As follows, the configuration of the display 90 will be described further in detail with reference to FIGS. 3 to 7. In FIGS. 3 to 6, the pixels are shown largely for explanation. In an actual configuration, the pixels may be much finer and may not be faced directly to the outside of the screen 92.

Figure 3:
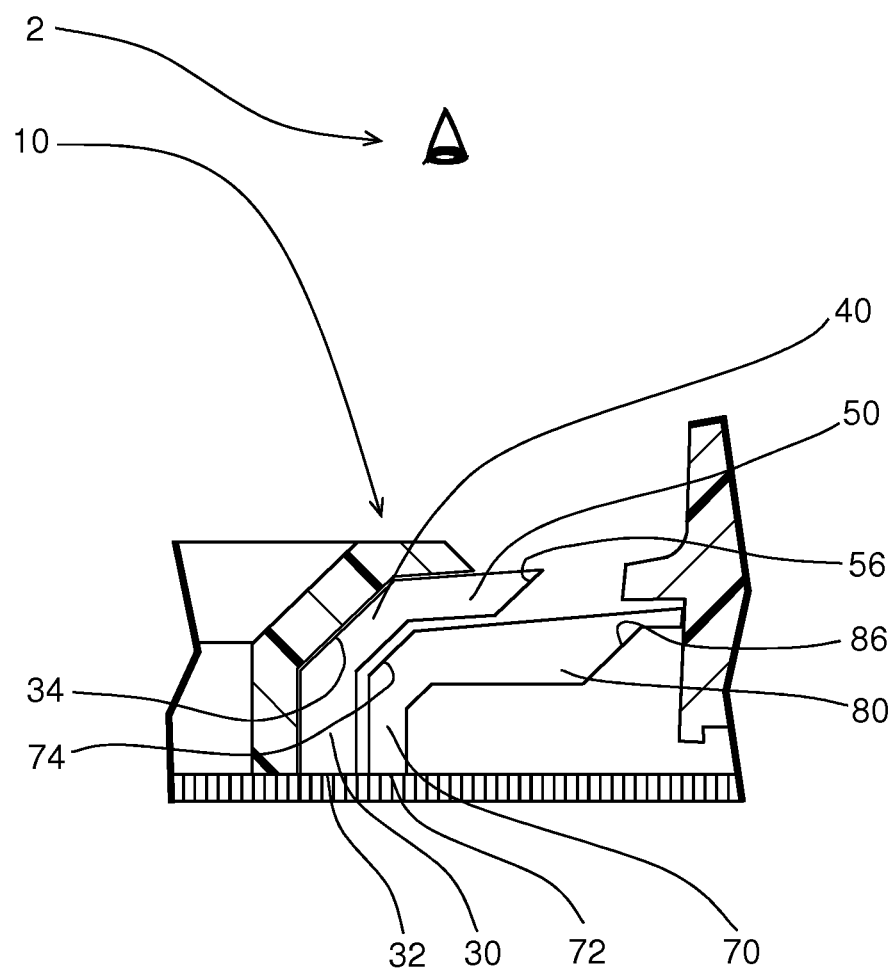
FIG. 3 is an enlarged sectional view showing the meter device.

FIG. 3 shows one side of the meter device 1 encircled by III in FIG. 2. Hatching is omitted in the radial conductor 20 and the ring conductor 60 in the FIG. 3. The conductor base 30 has a radial-conductor receiver reflection surface 34 inclined relative to the annular end surface 32. The outer segment 50 has a radial-conductor emitter reflection surface 56 inclined relative to the annular end surface 32. The radial-conductor receiver reflection surface 34 and the radial-conductor emitter reflection surface 56 are opposed to each other and may be substantially in parallel with each other. The conductor base 30, the annular body 40, and the outer segment 50 form a bent light conduction passage. When viewed from a user 2 along the height direction, the annular end surface 32 is concealed by the opaque cover 10.

The ring body 70 has a ring-conductor receiver reflection surface 74 inclined relative to the annular end surface 72. The ring disc 80 has a ring-conductor emitter reflection surface 86 inclined relative to the annular end surface 72. The ring-conductor receiver reflection surface 74 and the ring-conductor emitter reflection surface 86 are opposed to each other and may be substantially in parallel with each other. The ring body 70 and the ring disc 80 form a bent light conduction passage. When viewed from the user 2 along the height direction, the annular end surface 72 is concealed by the opaque cover 10.

Figure 4:
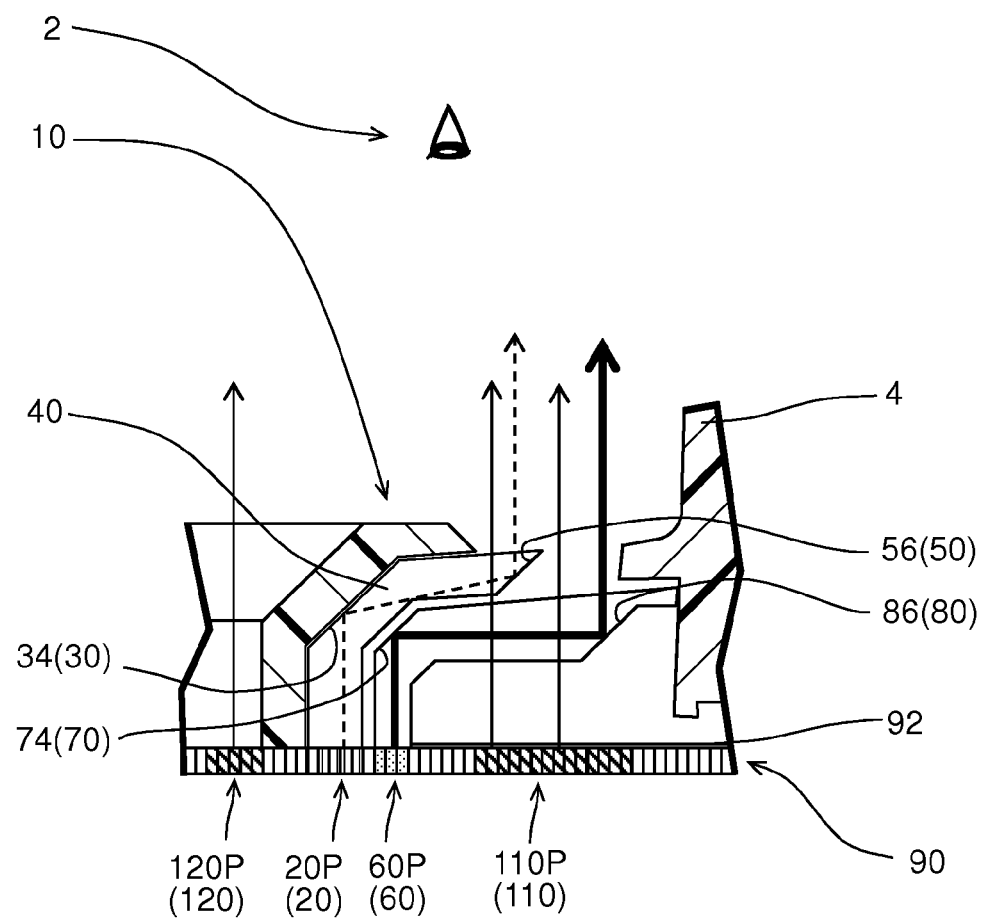
FIG. 4 is an enlarged sectional view showing lights passing through a light conductor device of the meter device.

In FIG. 4, the display 90 activates specific pixels. For example, each pixel may include red, green, and blue (RGB) pixel segments, and intensity of energization or de-energization of each of the RGB pixel segments may be selectively controlled to produce various combination of activated RGB pixel segments. Thus, each pixel is caused to produce luminescence (light) in various colors. As shown by differentiated hatchings and black fillings, the pixels emit lights in different colors selectively.

The display 90 activates inner pointer pixels 120P, radial conductor pixels 20P, ring conductor pixels 60P, and outer pointer pixels 110P. The inner pointer pixels 120P correspond to the inner pointer 120. The outer pointer pixels 110P correspond to the outer pointer 110.

The inner pointer pixels 120P emit light along the thin arrow through a hollow center of the opaque cover 10 to enable the user 2 to view the inner pointer 120.

The radial conductor pixels 20P emit light (first light) along the dotted arrow through the conductor base 30, the annular body 40, and the outer segment 50. Specifically, the light incident from the radial conductor pixels 20P passes through the conductor base 30 along the height direction. The light is reflected on the radial-conductor receiver reflection surface 34 and directed outward in the radial direction to pass through the annular body 40. The light is further reflected on the radial-conductor emitter reflection surface 56 and directed upward in FIG. 4. Thus, the light is emitted from the outer segment 50. The light incident from the outer segment 50 is viewed as a tick mark by the user 2. Thus, the light incident from the radial conductor pixels 20P is emitted from the radial-conductor emitter reflection surface 56 at a radially remote location from the radial conductor pixels 20P. To the contrary, the light reflected on the radial-conductor receiver reflection surface 34 and directed to pass outward in the radial direction through both the annular body 40 and the outer segment 50 is substantially invisible from the user 2. That is, the outer segment 50, excluding the radial-conductor emitter reflection surface 56, is viewed as substantially transparent by the user 2.

The ring conductor pixels 60P emit light (third light) along the bold arrow through the ring body 70 and the ring disc 80. Specifically, the light incident from the ring conductor pixels 60P passes through the ring body 70 along the height direction. The light is reflected on the ring-conductor receiver reflection surface 74 and directed outward in the radial direction to pass through the ring disc 80. The light is further reflected on the ring-conductor emitter reflection surface 86 and directed upward in FIG. 4. The light incident from the ring disc 80 is viewed as a ring by the user 2. Thus, the light incident from the ring conductor pixels 60P is emitted from the ring-conductor emitter reflection surface 86 at a radially remote location from the ring conductor pixels 60P. To the contrary, the light reflected on the ring-conductor receiver reflection surface 74 and directed to pass outward in the radial direction through the ring disc 80 is substantially invisible from the user 2. That is, the ring disc 80, excluding the ring-conductor emitter reflection surface 86, is viewed as substantially transparent by the user 2.

As shown by the two thin arrows, the outer pointer pixels 110P emit lights (second light and fourth light) along the height direction through the outer segment 50 and the ring disc 80. As described above, the outer segment 50 and the ring disc 80, each conducting the reflected light, is still viewed as transparent from the user 2, excluding the radial-conductor emitter reflection surface 56 and the ring-conductor emitter reflection surface 86. Therefore, the light incident from the outer pointer pixels 110P passes through the outer segment 50 and the ring disc 80 along the height direction to be viewable by the user 2. In the present configuration, the light incident from the outer pointer pixels 110P intersects with both the light conducted through the outer segment 50 and the light conducted though the ring disc 80.

In the present configuration, the ring, which is shown by the ring-conductor emitter reflection surface 86, is viewable to be floating relative to the screen 92, and the tick mark, which is shown by the radial-conductor emitter reflection surface 56, is viewable to be floating further relative to the ring. Thus, the radial conductor 20, the ring conductor 60, and the screen 92 form a multilayered illuminative structure to enhance its three-dimensional appearance.

Figure 5:
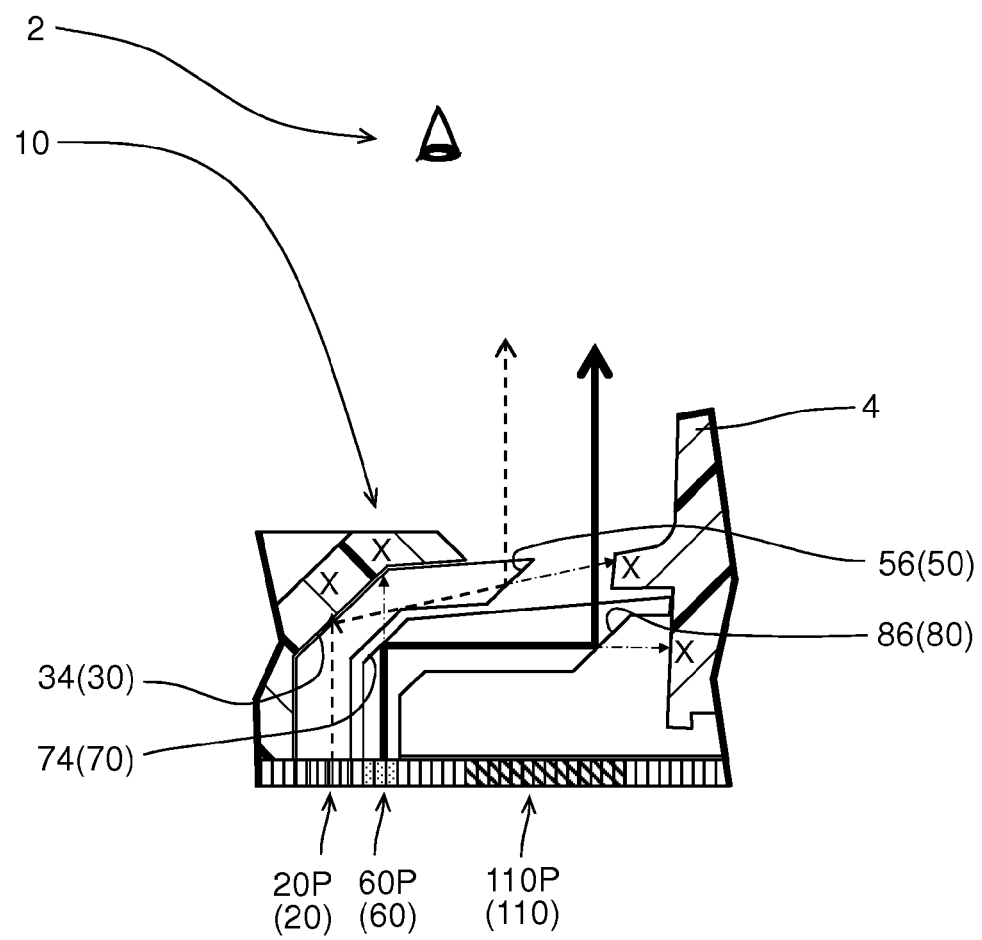
FIG. 5 is an enlarged sectional view showing lights reflected in the light conductor device and passing through surfaces of the light conductor device.

As shown in FIG. 5, the light incident from the ring conductor pixels 60P may not totally reflect on the ring-conductor receiver reflection surface 74 and may pass through the ring-conductor receiver reflection surface 74 upward in FIG. 5 along the height direction, as shown by the thin chain line. In addition, the light reflected on the ring-conductor receiver reflection surface 74 may not totally reflect on the ring-conductor emitter reflection surface 86 and may pass through the ring-conductor emitter reflection surface 86 rightward in FIG. 5 substantially along the radial direction, as shown by the thin chain line. Nevertheless, the light passing through the ring-conductor receiver reflection surface 74 collides against the opaque cover 10, and the light passing through the ring-conductor emitter reflection surface 86 also collides against the housing 4, as shown by "X." Therefore, the light incident from the ring conductor pixels 60P is viewed by the user 2 selectively on the ring-conductor emitter reflection surface 86, as the ring. Similarly, the light passing through the radial-conductor receiver reflection surface 34 collides against the opaque cover 10, and the light passing through the radial-conductor emitter reflection surface 56 also collides against the housing 4, as shown by "X." Therefore, the light incident from the radial conductor pixels 20P is viewed by the user 2 selectively on the radial-conductor emitter reflection surface 56, as the tick mark.

Figure 6:
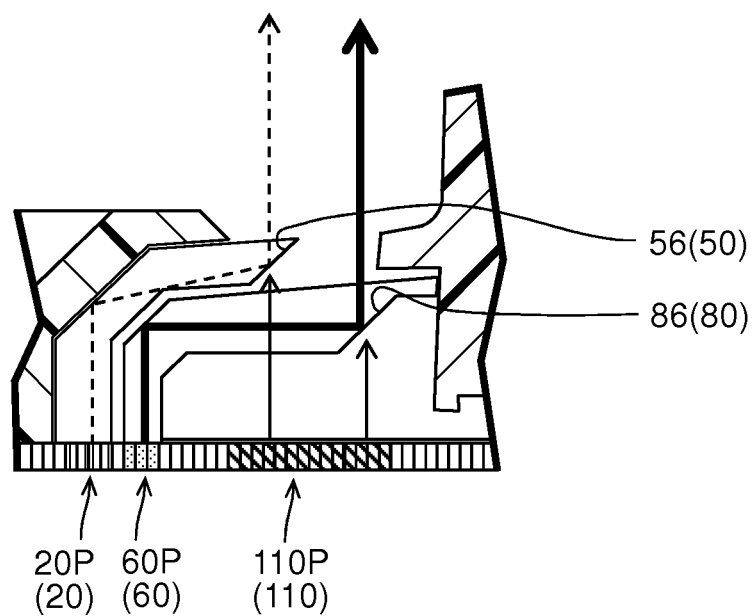
FIG. 6 is an enlarged sectional view showing lights reflected in the light conductor device and lights emitted from a display to the light conductor device.

As shown in FIG. 6, the light incident from the outer pointer pixels 110P may pass trough the radial-conductor emitter reflection surface 56 and may interfere with the light reflected on the radial-conductor emitter reflection surface 56. Similarly, the light incident from the outer pointer pixels 110P may pass trough the ring-conductor emitter reflection surface 86 and may interfere with the light reflected on the ring-conductor emitter reflection surface 86. In this way, the present interferences may be utilized to blend the lights thereby to produce various effects.

Figure 7:
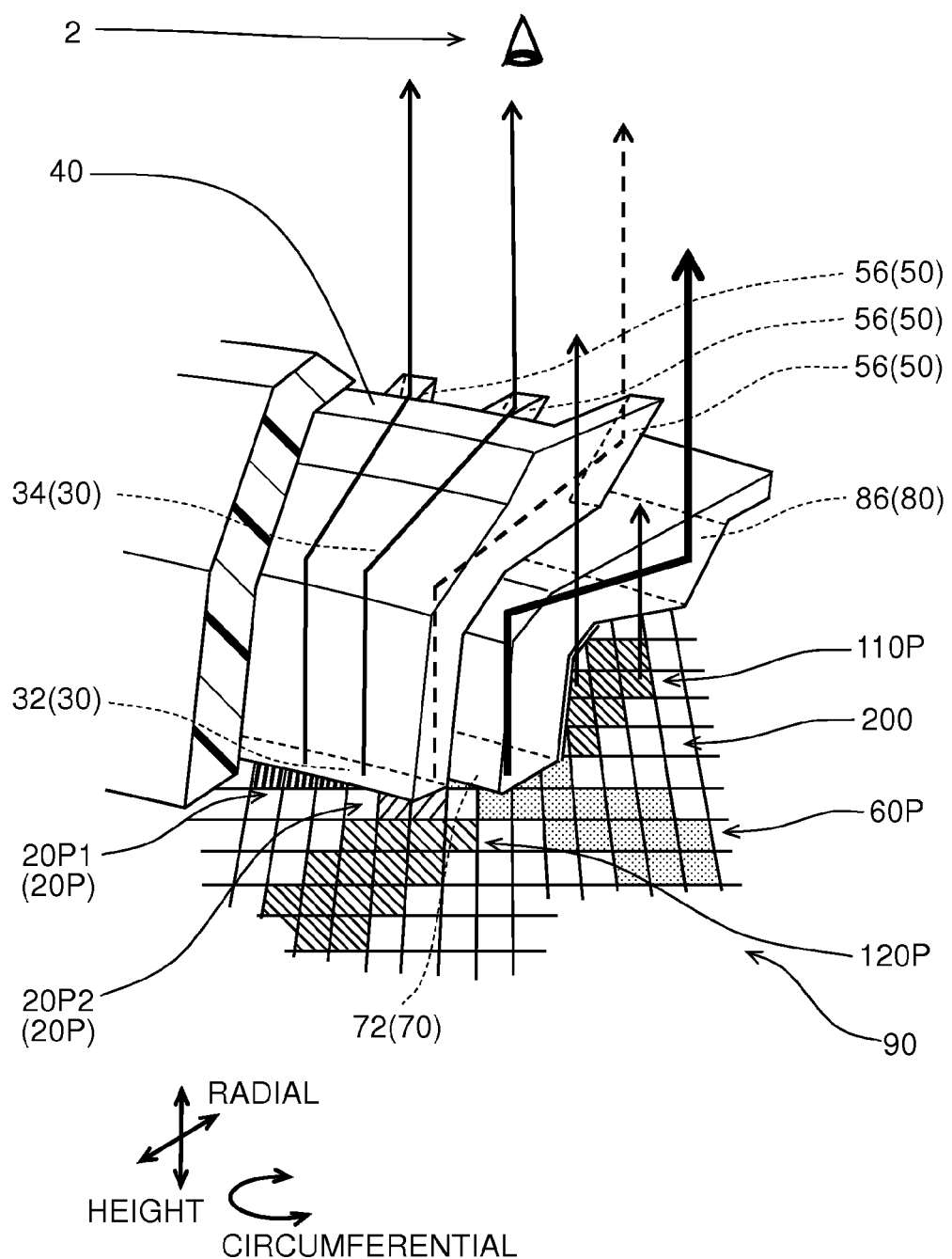
FIG. 7 is a perspective view showing the light conductor device mounted on the display.

As shown in FIG. 7, the display 90 has the dot matrix configuration to enable activation of the pixels selectively. FIG. 7 shows the pixels coarsely, nevertheless, in an actual product of the display 90, the pixels may be finely assigned to corresponded substantially to the outlines of the annular end surface 72 and the annular end surface 32, and the outlines of the inner pointer 120 and the outer pointer 110. In the example, the ring conductor pixels 60P, the radial conductor pixels 20P, the outer pointer pixels 110P, and the inner pointer pixels 120P are described as being assigned at respective positions. It is noted that, those pixels are not fixed at respective positions and may be moved according to selective activation of pixels in the dot-matrix configuration.

The ring conductor pixels 60P are in an annular form along the annular end surface 72 of the ring body 70 to extend in the circumferential direction. The ring conductor pixels 60P emit light to illuminate the ring-conductor emitter reflection surface 86 according to the intensity of the ring conductor pixels 60P.

The radial conductor pixels 20P are arranged correspondingly to the shape of the annular end surface 32 of the conductor base 30. The radial conductor pixels 20P are arranged in the circumferential direction correspondingly to the arrangement of the conductor base 30. The radial conductor pixels 20P emit light to illuminate the radial-conductor emitter reflection surface 56 according to the intensity of the radial conductor pixels 20P. In the example of FIG. 7, the radial conductor pixels 20P include small radial conductor pixels 20P1 and large radial conductor pixels 20P2 to emit lights in different colors. The small radial conductor pixels 20P1 may further include two or more pixel groups in different colors correspondingly to the conductor base 30.

Each of the outer segments 50 extends substantially linearly from the annular body 40 in the radial direction. Thus, the light reflected on the radial-conductor receiver reflection surface 34 is selectively directed linearly toward the radial-conductor emitter reflection surface 56, as shown by the thin arrows and thin chain arrow in FIG. 7.

In the description, the intensity of the pixels may represent the light intensity of the pixels and/or the illumination color of the pixels.

The conductor base 30 may receive entirely lights in same intensity (e.g., same color), lights in similar intensities (e.g., similar color) to produce a color-gradation effect, and/or lights in different intensities (e.g., different color) to produce a color-separated effect. Similarly, the ring body 70 may receive lights in same intensity, lights in similar intensities, or lights in different intensities along the circumferential direction.

The outer pointer pixels 110P and the inner pointer pixels 120P indicate a moving picture representing a pointer, which is rotatable according to an indicated object, such as a vehicle speed and/or an engine revolution. The outer pointer pixels 110P are arranged on an extension line of the inner pointer pixels 120P extended outward in the radial direction. The light emitted from the outer pointer pixels 110P passes through the outer segment 50 and the ring disc 80, as described above. The outer pointer pixels 110P are surrounded by background pixels 200 (not hatched) in the circumferential direction, and the background pixels 200 may emit light to pass through the outer segment 50 and the ring disc 80.

Figure 8:
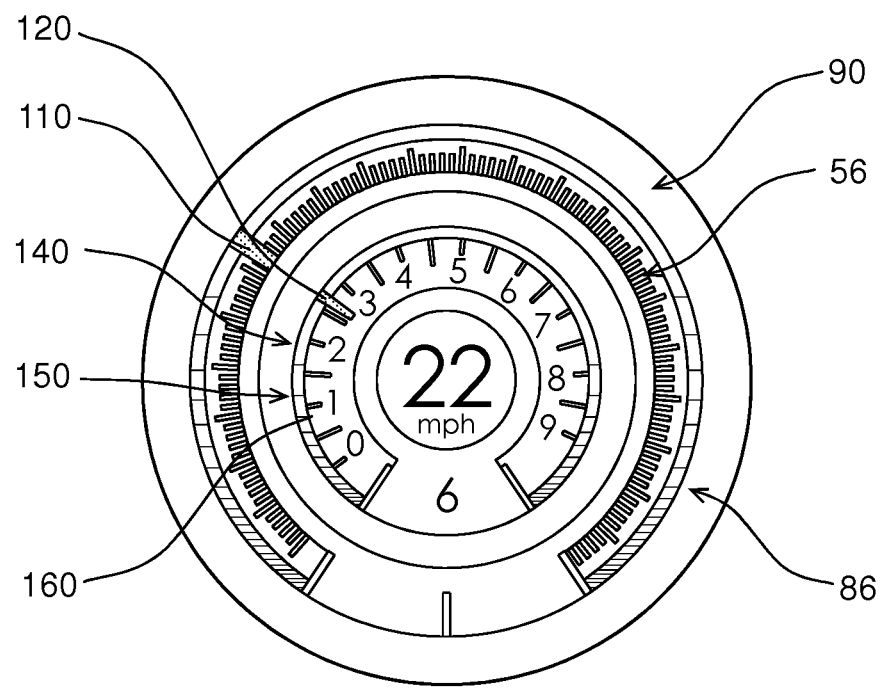
FIG. 8 is a top view showing the meter device.

As shown in FIG. 8, the tick marks are indicated on the radial-conductor emitter reflection surfaces 56. The ring is indicated on the ring-conductor emitter reflection surface 86 located outside the tick marks. The display 90 indicates numeral symbols 150, the inner pointer 120, the outer pointer 110, and the scale 140. The display 90 further indicates an inner ring 160 inside the tick marks.

The tick marks (radial light conductor 20), the ring (ring light conductor 60), and/or the display 90 may produce various effects such as a welcome sequence, a warning sequence, and/or a driving support sequence. The welcome sequence may be implemented to welcome or entertain a user on detection of existence of the user. The warning sequence may be implemented on detection of an object such as an oncoming vehicle. The driving support sequence may be implemented to guide a driver to turn the vehicle, to accelerate and/or decelerate the vehicle and/or to notify an operation mode, such as a 2WD/4WD mode, and/or a manual/auto cruising mode. The tick marks and/or the ring may produce a color-gradation effect and/or may produce various effects correspondingly to, for example, a various moving picture shown on the display 90. The display 90 may be configured to show an image with various effects such as gradual and/or quick color change, flashing, dimming, rotation, linear movement, and/or ripple-like movement and various combinations of these effects.

(Operation Effect)

As described above, the outer segments 50 are distant from each other in the circumferential direction. That is, the outer segments 50 are separated from each other in the circumferential direction. Therefore, light emitted to one outer segment 50 hardly interferes with light emitted to an adjacent outer segment 50. The lights emitted to the conductor base 30 may be conducted selectively to corresponding outer segments 50, respectively, with small diffusion.

The annular body 40 bridges the conductor base 30 and the outer segments 50 into a single piece. Therefore, the conductor base 30 and the outer segments 50 can be integrally molded. Thus, the radial conductor 20 can be formed in a simple manufacturing process at a low cost.

The conductor base 30 reflects the first light from the light source 90 on the radial-conductor receiver reflection surface 34 toward the radial-conductor emitter reflection surfaces 56 of the one outer segments 50, respectively. The outer segments 50 reflect the first light from the radial-conductor receiver reflection surface 34 on the radial-conductor emitter reflection surfaces 56, respectively, and emit the first light to an outside of the outer segments 50. The present configuration enables the light reflected on the radial-conductor receiver reflection surface 34 to be emitted from the radial-conductor emitter reflection surfaces 56 at the remote position in the radial direction.

The annular body 40 conducts the first light from the radial-conductor receiver reflection surface 34 to the radial-conductor emitter reflection surface 56 outward in the radial direction. The outer segments 50 conduct the second light emitted from the light source 90 at a position outside the conductor base 30, such that the second light intersects with the first light. The outer segments 50 emit the first light according to the intensity of the first light emitted from the light source 90 and conduct the second light according to the intensity of the second light emitted from the light source 90. The present configuration enables to emit the first light and the second light individually at different intensities, e.g., different colors and/or different light strengths.

The opaque cover 10 is coupled with the radial conductor 20 to conceal at least partially the conductor base 30. The opaque cover 10 at least partially extends in the radial direction to conceal at least partially the conductor base 30. The present configuration enables the light to be invisible from the user 2 on the radial-conductor receiver reflection surface 34 and to be visible from the user 2 on the radial-conductor emitter reflection surface 56 at the remote position.

The ring conductor 60 is coupled with the radial conductor 20. The ring conductor 60 reflects the third light from the light source 90 on the ring-conductor receiver reflection surface 74 toward the ring-conductor emitter reflection surface 86. The ring conductor 60 reflects the third light from the ring-conductor receiver reflection surface 74 on the ring-conductor emitter reflection surface 86 and emits the third light to an outside of the ring conductor 60. The ring body 70 is substantially in the tubular shape having the ring-conductor receiver reflection surface 74. The ring disc 80 is substantially in the disc shape and located outside the ring body 70 in the radial direction. The ring disc 80 has the ring-conductor emitter reflection surface 86. The present configuration enables the light reflected on the ring-conductor receiver reflection surface 74 to be emitted from the ring-conductor emitter reflection surface 86 at the remote position.

The ring disc 80 conducts the third light from the ring-conductor receiver reflection surface 74 to the ring-conductor emitter reflection surface 86 outward in the radial direction. The ring disc 80 conducts the fourth light emitted from the light source 90 at the position outside the ring body 70, such that the third light intersects with the fourth light. The present configuration enables the third light and the fourth light to be emitted at different positions in the radial direction and in the height direction, thereby to enhance its three-dimensional appearance.

The ring disc 80 emits the third light according to an intensity of the third light emitted from the light source 90 and conducts the fourth light according to an intensity of the fourth light emitted from the light source 90. The present configuration enables to emit the third light and the fourth light individually at different intensities, e.g., different colors and/or different light strengths.

The ring conductor 60 is stacked on the surface of the light source 90, and the radial conductor 20 is stacked on the ring conductor 60. The radial-conductor emitter reflection surface 56 is at a first height from the surface of the light source 90. The ring-conductor emitter reflection surface 86 is at a second height from the surface of the light source 90. The first height is greater than the second height. The present configuration enables to enhance the three-dimensional appearance of the ring conductor 60, the radial conductor 20, and the light source 90, which are combined together.

Second Embodiment

Figure 9:
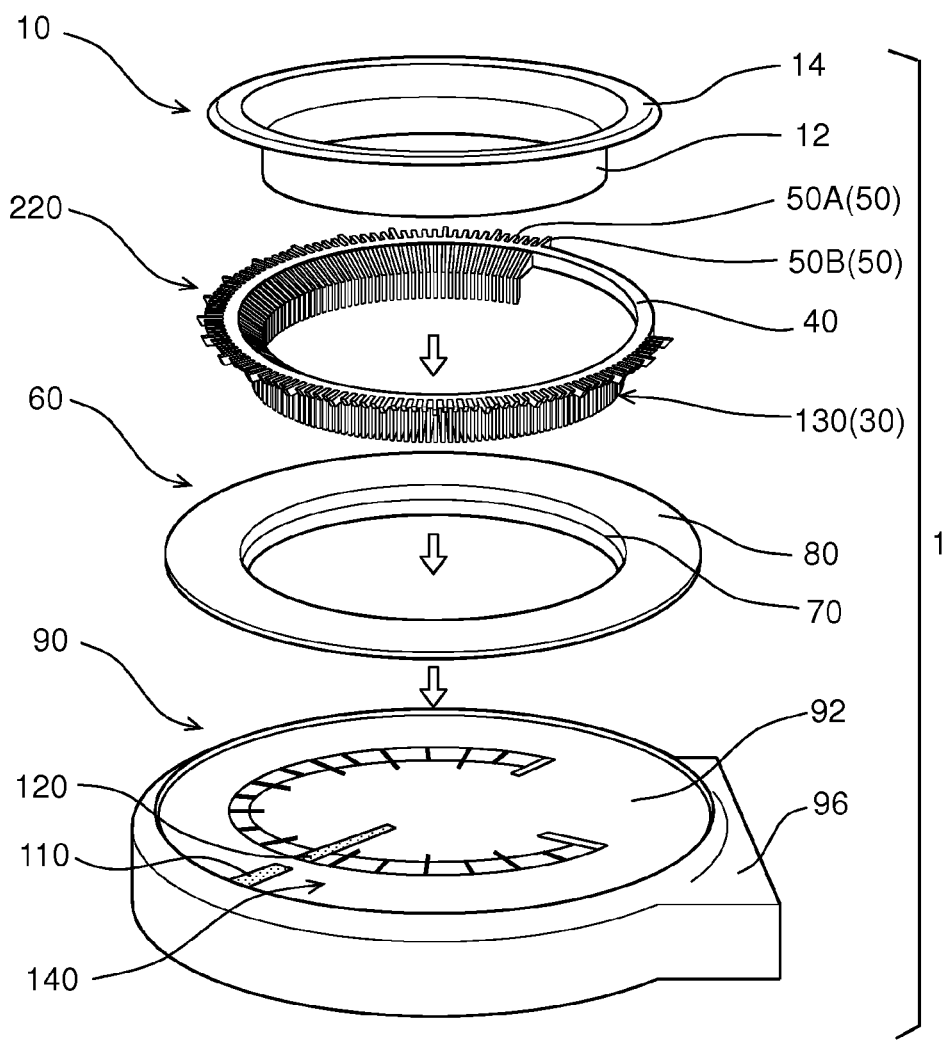
FIG. 9 is an exploded perspective view showing components of a meter device according to a second embodiment.
Figure 9:
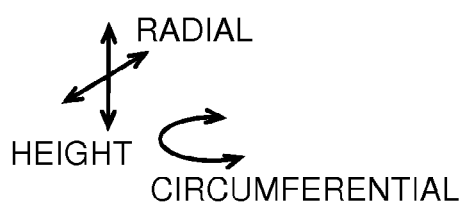

As follows, a second embodiment of the present disclosure will be described with reference to FIGS. 9 to 10. In the second invention, the conductor base 30 is divided into multiple inner segments 130.

A radial conductor 220 is integrally molded of a substantially transparent light-conductive material. The radial conductor 220 includes the multiple inner segments 130 and the multiple outer segments 50, which are bridged with each other through the annular body 40 into the single piece.

The inner segments 130 are each in a plate shape extending radially inward from an inner circumferential periphery of the annular body 40. The inner segments 130, which are adjacent in the circumferential direction, are distant and isolated from each other in the circumferential direction. The inner segments 130 and the outer segments 50 are provided in a predetermined meter angular range excluding the no-radial conductor region on the right side in FIG. 9.

Figure 10:
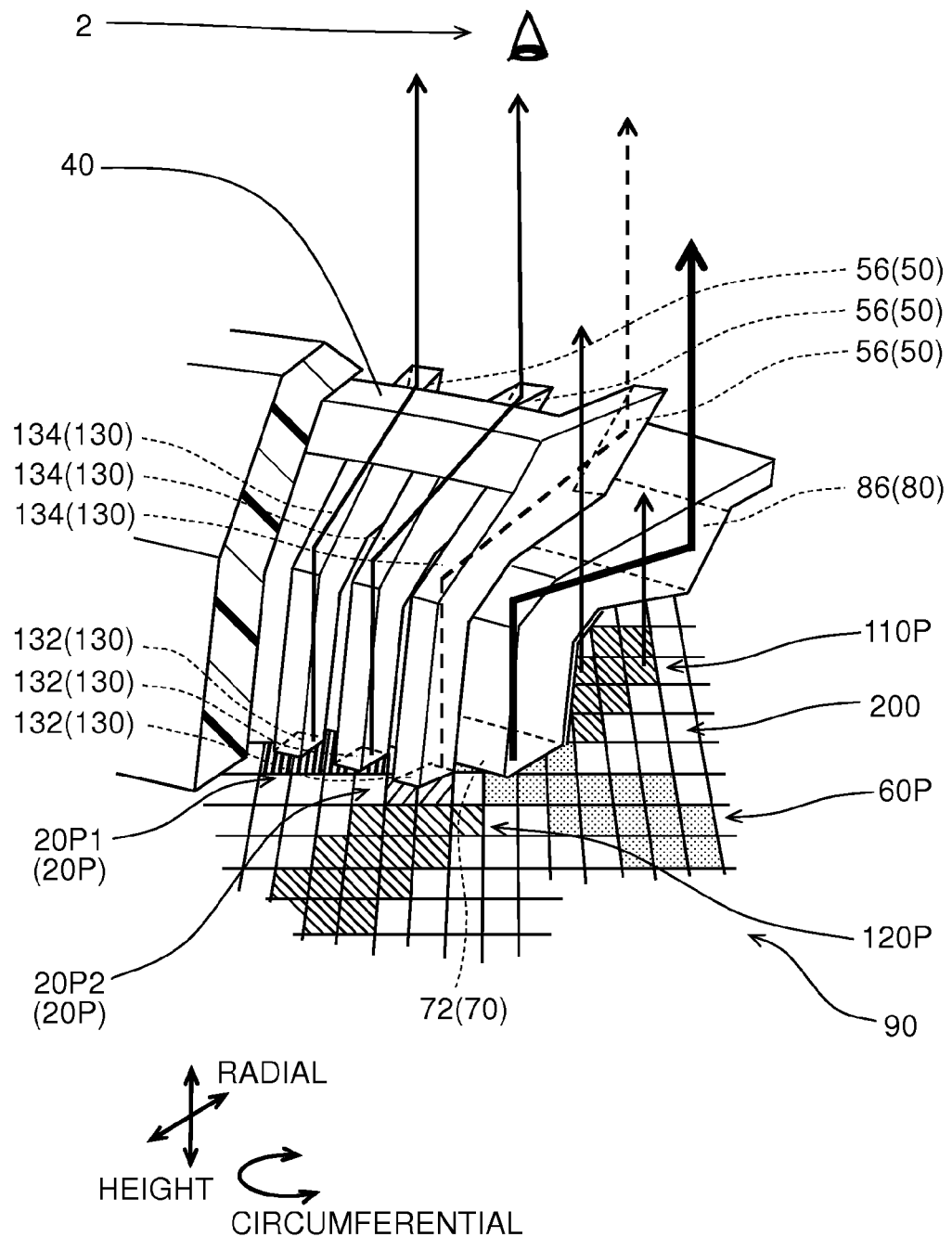
FIG. 10 is a perspective view showing the light conductor device mounted on the display.

As shown in FIG. 10, each of the inner segments 130 has a rectangular end surface 132 on the lower side in FIG. 10. The rectangular end surface 132 is faced to the screen 92. The inner segment 130 has a radial-conductor receiver reflection surface 134 inclined relative to the rectangular end surface 132. The radial-conductor receiver reflection surface 134 and the radial-conductor emitter reflection surface 56 of the outer segment 50 are opposed to each other and may be substantially in parallel with each other. The inner segment 130, the annular body 40, and the outer segment 50 form the bent light conduction passage. When viewed from the user 2 along the height direction, the rectangular end surface 132 is concealed by the opaque cover 10.

The radial conductor pixels 20P are arranged correspondingly to the shape of the rectangular end surface 132 of the inner segment 130. The radial conductor pixels 20P are arranged in the circumferential direction correspondingly to the arrangement of the inner segments 130. The radial conductor pixels 20P emit light to illuminate the radial-conductor emitter reflection surface 56 according to the intensity of the radial conductor pixels 20P. In the example of FIG. 10, the radial conductor pixels 20P include small radial conductor pixels 20P1 and large radial conductor pixels 20P2 to emit lights in different colors. The small radial conductor pixels 20P1 may further include two or more pixel groups in different colors correspondingly to the inner segments 130.

Each of the outer segments 50 extends substantially linearly from the annular body 40 along an extension line, which is substantially straight, along which the corresponding inner segment 130 extends in the radial direction. Thus, the light reflected on the radial-conductor receiver reflection surface 134 is selectively directed linearly toward the radial-conductor emitter reflection surface 56, as shown by the thin arrows and thin chain arrow in FIG. 10.

The inner segments 130 adjacent to each other in the circumferential direction may receive lights in same intensity (e.g., same color), lights in similar intensities (e.g., similar color) to produce a color-gradation effect, and/or lights in different intensities (e.g., different color) to produce a color-separated effect.

The light source 90 has the pixels activated selectively. The radial conductor 20 is stacked on the light source 90. One inner segment 130 receives light from one of the pixels. Another inner segment 130 receives light from another pixel. The present configuration enables to illuminate the inner segments 130 individually at different intensities, e.g., different colors and/or different light strengths.

(Operation Effect)

In the second embodiment, the inner segments 130 are distant from each other in the circumferential direction. That is, the inner segments 130 are separated from each other in the circumferential direction. Therefore, light emitted to one inner segment 130 hardly interferes with light emitted to an adjacent inner segment 130. Furthermore, the light emitted to one inner segment 130 may be conducted selectively to corresponding one outer segment 50 with small diffusion to another outer segment 50.

One inner segment 130 reflects the first light from the light source 90 on the radial-conductor receiver reflection surface 134 toward the radial-conductor emitter reflection surface 56 of the corresponding one outer segment 50. The corresponding one outer segment 50 reflects the first light from the radial-conductor receiver reflection surface 134 on the radial-conductor emitter reflection surface 56 and emits the first light to an outside of the corresponding one outer segment 50. The present configuration enables the light reflected on the radial-conductor receiver reflection surface 134 to be emitted from the radial-conductor emitter reflection surface 56 at the remote position in the radial direction.

The corresponding one outer segment 50 extends linearly substantially along the extension line along which the one inner segment 130 extends in the radial direction. The present configuration enables the light emitted to the one inner segment 130 to be conducted selectively to the corresponding one outer segment 50.

The light source 90 has the pixels activated selectively. The radial conductor 220 is stacked on the light source 90. One inner segment 130 receives light from one of the pixels. Another inner segment 130 receives light from another pixel. The present configuration enables to illuminate the inner segments 130 individually at different intensities, e.g., different colors and/or different light strengths.

Other Embodiment

The radial conductor 20 is not limited to an integrally formed single piece and may be constructed of multiple components into a single piece.

The ring may be located inside the tick marks in the radial direction. The ring (ring-conductor emitter reflection surface 86) may be located higher than the tick marks (radial-conductor emitter reflection surface 56) in the height direction.

The conductor base 30 may have a cross section perpendicular to the height direction, and the cross section is substantially in a O-shape. That is, the conductor base 30 may be in a tubular shape extending in the circumferential direction entirely.

The description is merely illustrative in nature and is in no way intended to limit the disclosure, its application, or uses. For purposes of clarity, the same reference numbers will be used in the drawings to identify similar elements. The phrase at least one of A, B, and C should be construed to mean a logical (A or B or C), using a non-exclusive logical or.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A light conductor device configured to receive light from a light source, the light conductor comprising:
   a radial conductor including:
      an annular body extending in a circumferential direction;
      a conductor base extending from the annular body inward in a radial direction, the conductor base extending in the circumferential direction; and
      a plurality of outer segments each extending from the annular body outward in the radial direction, the outer segments arranged in the circumferential direction and distant from each other in the circumferential direction, wherein
the annular body is located between the conductor base and the outer segments in the radial direction to bridge the conductor base and the outer segments into a single piece.

2. The light conductor device according to claim 1, wherein the conductor base is substantially in a tubular shape having a cross section in an O-shaped or a C-shape.

3. The light conductor device according to claim 1, wherein
the conductor base is configured to reflect first light from the light source on a radial-conductor receiver reflection surface toward radial-conductor emitter reflection surfaces of the outer segments, respectively, and
the outer segments are configured to reflect the first light from the radial-conductor receiver reflection surface on the radial-conductor emitter reflection surfaces, respectively, and to emit the first light to an outside of the outer segments.

4. The light conductor device according to claim 3, wherein the annular body is configured to conduct the first light from the radial-conductor receiver reflection surface to the radial-conductor emitter reflection surfaces outward in the radial direction.

5. The light conductor device according to claim 4, wherein the outer segments are further configured to conduct second light emitted from the light source at a position outside the conductor base, such that the second light intersects with the first light.

6. The light conductor device according to claim 5, wherein
the outer segments are configured
to emit the first light according to an intensity of the first light emitted from the light source and
to conduct the second light according to an intensity of the second light emitted from the light source.

7. The light conductor device according to claim 3, further comprising:
a ring conductor configured to be coupled with the radial conductor,
the ring conductor is configured to reflect third light from the light source on a ring-conductor receiver reflection surface toward a ring-conductor emitter reflection surface, and
the ring conductor is further configured to reflect the third light from the ring-conductor receiver reflection surface on the ring-conductor emitter reflection surface and to emit the third light to an outside of the ring conductor.

8. The light conductor device according to claim 7, wherein
the ring conductor includes a ring body and a ring disc,
the ring body is substantially in a tubular shape having the ring-conductor receiver reflection surface,
the ring disc is substantially in a disc shape and located outside the ring body in the radial direction, and
the ring disc has the ring-conductor emitter reflection surface.

9. The light conductor device according to claim 8, wherein
the ring disc is configured
to conduct the third light from the ring-conductor receiver reflection surface to the ring-conductor emitter reflection surface outward in the radial direction,
to conduct fourth light emitted from the light source at a position outside the ring body, such that the third light intersects with the fourth light,
to emit the third light according to an intensity of the third light emitted from the light source, and
to conduct the fourth light according to an intensity of the fourth light emitted from the light source.

10. The light conductor device according to claim 7, wherein
when the ring conductor is stacked on a surface of the light source and when the radial conductor is stacked on the ring conductor,
the radial-conductor emitter reflection surface is at a first height from the surface of the light source,
the ring-conductor emitter reflection surface is at a second height from the surface of the light source, and
the first height is greater than the second height.

11. The light conductor device according to claim 1, further comprising:
an opaque cover integrally formed of an opaque material to extend in the radial direction, wherein
the opaque cover is configured to be coupled with the radial conductor to conceal at least partially the conductor base.

12. A meter device comprising:
the radial conductor according to claim 1; and
the light source according to claim 1, wherein
the light source has a plurality of pixels configured to be activated selectively,
the radial conductor is stacked on the light source, and
the conductor base is configured to receive light from the pixels.

13. The light conductor device according to claim 1, wherein the conductor base includes a plurality of inner segments each extending from the annular body inward in the radial direction, the inner segments arranged in the circumferential direction and distant from each other in the circumferential direction.

14. The light conductor device according to claim 13, wherein
at least one of the inner segments is configured to reflect first light from the light source on a radial-conductor receiver reflection surface toward a radial-conductor emitter reflection surface of corresponding one of the outer segments, and
the corresponding one of the outer segments is configured to reflect the first light from the radial-conductor receiver reflection surface on the radial-conductor emitter reflection surface and to emit the first light to an outside of the corresponding one of the outer segments.

15. The light conductor device according to claim 14, wherein the corresponding one of the outer segments extends linearly substantially along an extension line along which the at least one of the inner segments extends in the radial direction.

16. A light conductor device comprising:
a radial conductor including a conductor base extending in a circumferential direction and a plurality of outer segments arranged in the circumferential direction, wherein
each of the outer segments has a radial-conductor emitter reflection surface at an outer position,
the conductor base has a radial-conductor receiver reflection surface at an inner position inside the outer position in the radial direction, and
the radial conductor is configured to receive light at the inner position and to emit the light at the outer position remotely in the radial direction by internally reflecting the light on the radial-conductor receiver reflection surface and further on the radial-conductor emitter reflection surface.

* * * * *